United States Patent
Berghmans et al.

[11] Patent Number: 6,127,439
[45] Date of Patent: Oct. 3, 2000

[54] PROCESS FOR THE PREPARATION OF POLYMER PARTICLES

[75] Inventors: Hugo Angela Albert Berghmans, Heverlee-Leuven, Belgium; Igor Chorvath, Eindhoven, Netherlands; Peter Kelemen, Heverlee-Leuven, Belgium; Eric Wilhelmus Johannes Frederik Neijman; Johannes Maria Zijderveld, both of Breda, Netherlands

[73] Assignee: NOVA Chemicals (International) S.A., Fribourg, Switzerland

[21] Appl. No.: 09/214,259

[22] PCT Filed: Jul. 3, 1997

[86] PCT No.: PCT/EP97/03607

§ 371 Date: Dec. 30, 1998

§ 102(e) Date: Dec. 30, 1998

[87] PCT Pub. No.: WO98/01501

PCT Pub. Date: Jan. 15, 1998

[30] Foreign Application Priority Data

Jul. 6, 1996 [EP] European Pat. Off. ............. 96201906

[51] Int. Cl.$^7$ ................... C08J 9/28; C08J 9/30
[52] U.S. Cl. ................... 521/65; 521/69; 521/71; 521/82; 521/84.1; 524/700; 524/732; 524/733; 524/734
[58] Field of Search .................. 521/65, 69, 71, 521/82, 84, 1; 524/700, 732, 733, 734

[56] References Cited

U.S. PATENT DOCUMENTS 5,358,998 10/1994 Wendel et al. ........................ 524/734
5,369,163 11/1994 Chiou et al. ......................... 524/458

FOREIGN PATENT DOCUMENTS 0 695 769 2/1996 European Pat. Off. .

*Primary Examiner*—Nathan M. Nutter
*Attorney, Agent, or Firm*—Kenneth H. Johnson

[57] ABSTRACT

The present invention provides a process for preparing an expandable polymer of a vinyl aromatic monomer and a polar water adsorbing monomer. The monomers are partially polymerized and then suspended in water so that the resulting beads contain from 3 to 40 weight % water which act as the sole or a predominant blowing agent.

9 Claims, No Drawings

PROCESS FOR THE PREPARATION OF POLYMER PARTICLES

The present patent application claims priority based upon European Patent Application 96 0 201 906.3 filed Jul. 4, 1996 (04.07.96).

The present invention relates to a process for the preparation of polymer particles containing polymer of a vinylarene monomer and a foaming agent and to polymer particles and to foamed articles.

Particles that contain such vinylarene polymer and foaming agent are generally known as expandable polymers. A well-known expandable polymer is expandable polystyrene. Expandable polystyrene is produced on a commercial scale by suspension polymerisation. The foaming agent is usually a low-boiling hydrocarbon, such as a $C_3$–$C_6$ hydrocarbon, in particular pentane. The expandable polystyrene is used for making foamed articles that are produced by expanding the polystyrene particles. In the expansion process the foaming agent is (partially) released and may be emitted into the environment. Such emissions are regarded undesirable and ways are sought to reduce the amount of hydrocarbon foaming agent.

In U.S. Pat. No. 5,096,931 expandable polystyrene is described which contains a small amount of a polar polymer and some water and some hydrocarbon foaming agent. This product is manufactured by suspension polymerisation of a mixture of styrene and the polar polymer in the presence of the hydrocarbon foaming agent. The disadvantage of the product obtained is that it still requires the presence of a hydrocarbon foaming agent apart from minor amounts of water.

It would thus be desirable if the amount of water could be increased at the expense of the amount of hydrocarbon foaming agent. One possible way to increase the amount of water would be to enhance the amount of polar polymer in the polymer particles. However, it would be difficult to incorporate the polar polymer into the polystyrene by suspension polymerisation because the polar polymer would wash out into the aqueous phase of the suspension. The unsatisfactory result is that too little polar polymer is incorporated into the resulting particles and, hence, that too little water has been taken up into these particles.

Surprisingly it has been found that more water could be incorporated into the polymer particles if the polymerisation is conducting in two steps. The amount of water that can be sued as foaming agent is such that one may refrain from incorporating any amount of hydrocarbon foaming agent.

Accordingly, the present invention provides a process for the preparation of polymer particles containing the polymer of a vinylarene monomer and having an average particle diameter of 0.1 to 6 mm, which process comprises:

a) mixing a polar polymer capable of absorbing at least 0.5 g of water per gram dry polar polymer with a vinylarene monomer;

b) pre-polymerising the vinylarene monomer in the mixture thus obtained to a polymerisation degree of 15 to 5% to obtain a pre-polymerised mass;

c) suspending the pre-polymerised mass into an aqueous medium to yield suspended particles; and d) polymerising the suspended particles to complete monomer conversion.

The present process is capable of yielding polymer particles with satisfactory expandability properties that do not contain an organic foaming agent. These polymer particles can be separated from the aqueous mixture and expanded to yield pre-expanded particles, which are optionally treated further to obtain foamed articles.

Suitable vinylarene monomers to be used in the present process are well known in the art and can suitably be selected from styrene, α-methylstyrene, chlorostyrene, dimethylstyrene, vinyltoluene and similar styrenic derivatives. Preferably, the vinylarene is styrene.

The polar polymers are defined as being capable of absorbing at least 0.5 g of water per gram of dry polymer. The absorption capacity is determined according to ASTM method F 716-82. Suitable absorption capacities range from 0.5 g water/g polar polymer to more than 200 g water/g polar polymer. Although any polar polymer can be used, it is suitable selected from polyvinyl alcohol, polyvinyl acetate, polyacrylic acid, polyethylene glycols and cellulose derivatives. Polyvinylpyrrolidone (PVP) is a preferred polar polymer. This polar polymer is completely miscible with water within the temperature range of 0 to 120° C. The absorption capacity is therefore taken to be higher than 200 g water/g of dry polymer.

Another preferred class of polar polymer is constituted by starch and modified starches. The modification of starch is suitably conducted by esterification or etherification. The water absorption of starch can be increased by gelatinisation. Starch may also be modified by etherification of part of the hydroxyl groups, e.g. from 0.1 to 10%, with an alkyl group, e.g. a $C_1$–$C_6$ alkyl group. Part of the hydroxyl groups may also be esterified. It is possible to make esters with a mono- or a dicarboxylic acid. Suitable acids include acetic, propionic and butyric acid, and malonic, maleic and succinic acid. Preferred acids are succinic acids which contain an alkyl or alkenyl substituent. The alkyl or alkenyl substituent has suitably from 1 to 16 carbon atoms. The dicarboxylic acids may be used in such amounts that from 0.1 to 10% of the hydroxyl groups are esterified. Preferably the monoester is formed; the remaining carboxylic group may be left acidic or be converted to a salt, e.g. an alkali metal or ammonium salt.

The starch can be modified before being added to the process, or the starch can be modified in situ. The latter can be achieved by contacting the starch with the modifying compound during the preparation process, preferably in process step a). Modifying compounds which are preferably used for in situ modification are (meth)acrylic acid and maleic acid. These compounds are preferred because they can also polymerise with the vinylarene monomer. Maleic acid is particularly preferred.

Vinylarene strains can be crosslinked by using cross-linking agents having two or more vinyl groups. The most convenient cross-linking agent is divinylbenzene. The latter compound is very suitable because of its complete compatibility with the vinylarene monomers. Preferably, polymerisation is carried out in the presence of a relatively small amount of cross-linking agent, e.g. from 0.001 to 0.1% wt, based on amount of vinylarene, preferably from 0.01 to 0.1% wt. This amount of cross-linking agent makes that the molecular weight of the vinylarene polymer increases, while substantially no cross-linking is observed. It has been found that such polymer gives polymer particles of increased expandability.

Cross-linking can also be achieved by using cross-linked polar polymer, e.g. cross-linked starch. The starch can have been cross-linked with a dibasic acid, e.g. α, ω-dicarboxyl alkanes having from 2 to 10 carbon atoms, such as adipic acid.

The polar polymer is suitably added as a polymer to the vinylarene monomer. It is, however, also possible to prepare the polar polymer in situ. An example of such an in-situ preparation is the formation of a mixture of acrylic acid and vinylarene, in which acrylic acid is polymerised in situ, prior to the pre-polymerisation of the vinylarene.

The polar polymer may have molecular weights which can vary within wide limits such as from 50 to 500,000,000. Suitable molecular weights (weight average molecular weight) range from 50,000 to 750,000.

The present invention makes it possible to manufacture polymer particles containing a relatively high amount of polar polymer and water. These amounts are suitably higher than the amounts employed in the polymers described in U.S. Pat. No. 5,096,931. Advantageously, the amount of polar polymer ranges from 2.0 to 20, preferably from 3.0 to 7.5% wt, based on the weight of the polar polymer and vinylarene monomer, and the amount of water in the particles produced, before prefoaming, ranges from more than 3 to 40% wt. If the content of polar polymer is too low, the water-adsorbing capacity of the resultant particle may remain unsatisfactorily low. If the amount is too high, the mechanical properties of the foamed article, made from the resultant particles, may be adversely affected.

The pre-polymerisation step may be conducted in any known manner. This includes anionic polymerisation, free-radical polymerisation and thermal polymerisation. The degree of monomer conversion can easily be controlled in thermal polymerisation by increasing or decreasing the temperature. Therefore, thermal polymerisation is preferred for the pre-polymerisation step. Preferably, the thermal polymerisation is effected by heating the solution to a temperature of 60 to 180° C., preferably from 110 to 130° C. When the desired conversion has been achieved the temperature is reduced and the polymerisation stops. It is most preferred to carry out the pre-polymerisation step by thermal polymerisation in the presence of a relatively small amount of free-radical initiator. A suitable amount is between 0.005 and 0.20% by weight of initiator, based on amount of vinylarene. It has been found that the presence of the small amount of initiator gives polymer particles of increased expandability.

Optimal conversion degrees may vary if different polar polymers are used. Preferably, the conversion varies between 15 and 40% of the vinylarene monomer, preferably between 25 and 40%. It is believed that due to the pre-polymerisation the mobility of the polar polymer in the pre-polymerised mass is reduced, thereby facilitating a find distribution of the polar polymer in the pre-polymerised mass. It is believed that by this fine distribution the water-uptake in the form of minute droplets is favoured.

Subsequent to the pre-polymerisation step the pre-polymerised mass is suspended in an aqueous medium. The volume ration between the aqueous medium and the pre-polymerised mass may vary between wide ranges, as will be appreciated by a person skilled in the art. Suitable volume ratios include 1:1 to 1:5 (pre-polymerised mass:aqueous phase). The optimal ratio is determined by economic considerations.

The aqueous medium may contain one or more conventional stabilizing agents, such as polyvinyl-alcohol, gelatine, polyethylene glycol, hydroxyethyl cellulose, carboxymethyl cellulose, polyvinyl pyrrolidone, polyacrylamide, but also salts of polyacrylic acid, phosphoric acid or pyrophosphoric acid, maleic acid, ethylene diamine tetraacetic acid, and the like, as will be appreciated by the person skilled in the art. The amount of the stabilizing agents may suitably vary from 0.1 to 0.9% wt based on the weight of the aqueous medium. For completeness' sake it is observed that during the suspension step c) and polymerisation step d) water is incorporated into the pre-polymerised mass. However, any polymeric stabilizing agent, e.g. polyvinyl pyrrolidone or hydroxyethyl cellulose, is essentially not taken up by the suspended pre-polymerised mass.

The polymerisation step d) is advantageously effected by free-radical polymerisation by means of a free-radical initiator. Thermal polymerisation is less preferred as it would need to be carried out at elevated pressure in view of the water present.

The free-radical initiator can be selected from the conventional initiators for free-radical styrene polymerisation. They include in particular organic peroxy compounds, such as peroxides, peroxycarbonates and peresters. Combinations of peroxy compounds can also be used. Typical examples of suitable peroxy initiators are $C_6-C_{20}$ acyl peroxides, such as decanoyl peroxide, benzoyl peroxide, octanoyl peroxide, stearyl peroxide, 3,5,5-trimethyl hexanoyl peroxide, peresters of $C_2-C_{18}$ acids and $C_1-C_5$ alkyl groups, such as t-butylperbenzoate, t-butylperacetate, t-butylperpivalate, t-butylperisobutyrate and t-butylperoxylaurate, and hydroperoxides and dihydrocarbyl ($C_3-C_{10}$) peroxides, such a s diisopropyl benzene hydroperoxide, di-t-butylperoxide, dicumylperoxide or combinations thereof. Radical initiators different from peroxy compounds are not excluded. A suitable example of such a compound is $\alpha,\alpha'$-azobisisobutyronitrile. The amount of radical initiator is suitably from 0.01 to 5% wt, based on the weight of the vinylarene monomer. The process is suitably initiated by heating the reaction mixture to elevated temperature, e.g. in the range of 60 to 140° C.

The polymerisation process of the step d) may suitable be carried out in the presence of a chain transfer agent. The person skilled in the art will appreciate that these chain transfer agents can be selected from mercaptans, such as $C_2-C_{15}$-alkyl mercaptans, e.g. n-dodecylmercaptan, t-dodecylmercaptan, n-butylmercaptan or t-butylmercaptan. Preferred are aromatic compounds such as pentaphenylethane, and in particular the dimer of α-methylstyrene.

The free radical polymerisation is suitably carried out at a temperature of 60 to 140° C., preferably 80 to 120° C., and a pressure of $0.3 \cdot 10^5$ to $6.0 \cdot 10^5$ Pa (0.3 to 6.0 bar), preferalby $2.5 \cdot 10^5$ to $4.0 \ 19^5$ Pa (2.5 to 4.0 bar), These reaction conditions are well-known to the skilled artisan.

The present invention enables the skilled artisan to manufacture expandable polymer particles with relatively high contents of polar polymers and water. Accordingly, the present invention also provides polymer particles containing a polymer of a vinylarene monomer, a polar polymer capable of absorbing at least 0.5 g of water per gram dry polar polymer, and water, which polymer particles contain from more than 3 to 40% of water, based on amount of vinylarene and have an average particle diameter of 0.1 to 6 mm. Preferably, the particles contain from 4 to 16% wt of water. These particles are expandable without the presence of a $C_3-C_6$ hydrocarbon foaming agent. This makes that the particles can contain less than 0.5% wt of $C_3-C_6$ hydrocarbon, more preferably less than 0.25% wt, based on amount of vinylarene. Most preferably, the particles contain no $C_3-C_6$ hydrocarbon. The amount of polar polymer can be varied in accordance with the desired amount of water. Advantageously the particles contain from 2.0 to 20% wt of polar polymer, based on the polar polymer and vinylarene.

The polymer particles may further contain several additives or coatings in effective amounts. Such additives include dyes, fillers, stabilizers, flame retarding compounds, nucleating agents, anti-static compounds and lubricants. Of particular interest are coating compositions containing glycerol- or metal carboxylates. Such compounds reduce the tendency of the particles to agglomerate. Suitable carboxylates are glycerol mono-, di- and/or tristearate and zinc stearate. Examples for such additive compositions are disclosed in GB-A-1,409,285. The coating compositions are deposited onto the particles via known methods, e.g., via dry-coating in a ribbon blender or via a slurry or solution in a readily vapourizing liquid.

The particles have advantageously an average diameter of 0.1 to 6 mm, preferably from 0.4 to 3 mm.

The expandable particles can be pre-foamed by conventional methods, e.g. by using steam, to yield particles having a reduced density, e.g. from 80 to 140 kg/m$^3$. It will be appreciated that in order to vapourize the water included in the particles to effect foaming, the temperature must be higher than used for $C_3$–$C_6$ hydrocarbon foaming agents, which have a lower boiling point than water. If steam is used the use of superheated steam is required. Foaming can also be effected by heating in oil, e.g. silicone oil, or by microwaves.

The pre-foamed articles can be further converted into foamed articles in any conventional way.

The present invention also relates to foamed articles containing a polymer of a vinylarene monomer, and a polar polymer capable of absorbing at least 0.5 g of water per gram dry polar polymer, in which the amount of polar polymer ranges from 2.0 to 20% wt, based on the polar polymer and vinylarene.

The particles obtained can be used in the preparation of foamed articles.

The invention will be further illustrated by means of the following examples.

EXAMPLE 1

An experiment was carried out using polyvinylpyrrolidone (PVP) with a weight average molecular weight of 360,000. The water absorption capacity of the PVP used was more than 200 g water/g dry PVP. The experiment was conducted by stirring 50 g styrene and 5.5 g of PVP and 1 g of dibenzoyl peroxide (DBP) as initiator under nitrogen for 1 hour. The mixture was heated to 80° C. for 0.5 hour under nitrogen during intensive stirring. The resulting highly viscous liquid (styrene conversion was 17%) was suspended in a solution of 3 g PVP and 1 g hydroxy ethyl cellulose (HEC) (to stabilise the suspension) in 300 g water at 90° C. while stirring vigorously. The reaction mixture was kept at 90° C. for 8 hours to complete the reaction. Subsequently, the reaction mixture was cooled to ambient temperature to yield polymer beads which were separated from the aqueous phase by filtration. The beads were foamed by subjecting them to hot silicone oil at 150° C. The beads contained by 10% PVP as determined spectroscopically by NMR. The water content of the beads and their expandability when heated to about 140° C. (expressed in ratio of volume of the expanded beads to volume of the beads before expansion), are shown in Table 1.

EXAMPLE 2

A similar experiment was carried out as Example 1 but with 0.5 g DBP as initiator. The pre-polymerisation reaction was conducted for 45 min at 80° C. In the resulting viscous liquid the styrene conversion was 18%. The pre-polymerised mass was suspended in an aqueous phase consisting of 1.2 g HEC and 3 g PVP and 0.5 mg potassium persulphate in 300 g water. The polymerisation was continued for 6 hours at 90° C. to yield complete polymerisation. The reaction mixture was cooled to ambient temperature to yield polystyrene beads. The PVP content of the beads was again 10% w. Water content and expandability are shown in Table 1.

EXAMPLE 3

A third similar experiment was carried out in which 55 g styrene and 5 g PVP was subjected to polymerisation in the presence of 0.55 g DBP and 0.37 g tert-butyl perbenzoate as initiators. This mixture was stirred under nitrogen for 12 hours. Subsequently, the reaction mixture was heated to 80° C. under vigorous stirring to provoke pre-polymerisation. The reaction mixture was kept at this temperature for 45 min to yield a viscous liquid (styrene conversion 18%). The liquid was suspended in an aqueous medium consisting of 1.2 g HEC and 2 g PVP in 300 g water at 90° C. The reaction mixture was kept at 90° C. for 5 hours to yield complete conversion. The reaction mixture was cooled to ambient temperature and the beads produced were filtered. The PVP content in the beads was 9% w. Water content and expandability are shown in Table 1.

TABLE 1

| Example No. | Water content, % wt on total bead | Expandability |
|---|---|---|
| 1 | 25 | 4 |
| 2 | 25 | 4 |
| 3 | 20 | 4 |

COMPARATIVE EXAMPLE 50 g Styrene and 5 g PVP were homogenised. To this mixture 0.5 g DBP was added. The resulting mixture was suspended in 300 g water. Whilst stirring the suspension was heated to 80° C. The suspension turned into a white latex without any distinct droplets being formed. After 4 hours at 80° C. the mixture is heated to 90° C. for one more hour. The mixture is cooled to ambient temperature and the resulting product is a white latex without any visible beads.

EXAMPLE 4

A number of larger scale experiments were carried out in which the amount of styrene was 1320 g, and the amount of PVP was 79, 120 or 211 g. The initiators were 18 g DBP and 8.9 g tert-butyl perbenzoate (TBPB). The pre-polymerisation was conducted at 120° C. for 2 hours in the absence of the initiators (Mode 1) or at 80° C. for 45 min in the presence of the initiators (Mode 2). In the former case the initiators were added to the mixture after dispersion of the pre-polymerised mass in the suspension. The suspension medium consisted of 43.6 g PVP, 26.1 g HEC and 36.1 mg potassium persulphate in 6550 g water. The suspension polymerisation was conducted for 4 hours at 90° C. and followed by heating at 120° C. for 2.5 hours. The results of these experiments are indicated at Table 2. The Table also includes expandability results of the beads which results were determined by measuring the volume expansion in silicone oil at 140° C.

TABLE 2

| Exp. No. | PVP, g | Pre-pol. | Conversion after pre-pol. | Water content, % w | Expandability |
|---|---|---|---|---|---|
| 4.1 | 79 | Mode 1 | 18 | 29 | 4 |
| 4.2 | 120 | Mode 2 | 30 | 37 | 4 |
| 4.3 | 211 | Mode 1 | 20 | 38 | 4 |

EXAMPLE 5

Styrene (79 pbw) was placed in a stainless steel reactor and stirred under nitrogen. Starch modified with 5% sodium n-octenylsuccinate ("CERESTAR 062E7" from Cerestar Benelux B.V.) in an amount of 5.3 pbw of modified starch dispersed in 15 pbw styrene was added to the reactor. The modified starch used had a water absorption capacity of 14 g water/g dry modified starch. A solution of 0.8 pbw DBP and 0.2 pbw TBPB in 6 pbw styrene was added to the reaction mixture. The temperature in the reactor was increased to 80° C. in 30 minutes and kept at this temperature for 155 mins. Subsequently the temperature was lowered to 70° C. and kept at this temperature for 130 mins. The styrene conversion in the pre-polymerised mass was 48%. The mass was subsequently transferred into a suspension polymerisation reactor containing 226 pbw of deionized water and 0.9 pbw HEC. The suspension was heated for 240 mins at 80° C., 60 mins at 90° C. and 60 mins at 120° C. Then the reaction mixture was allowed to cool to ambient temperature. The beads produced were filtered. The beads had a water content of 7% wt, based on the amount of styrene, starch and water.

The beads, having a density of about 1050 g/dm$^3$, were exposed to an air stream of 135° C. Expansion of the beads with a particle diameter of 0.9–1.25 mm, resulted in a foam with a density of 110–140 g/dm$^3$.

EXAMPLE 6

Styrene (80 pbw), maleic anhydride (0.5 pbw in 3 pbw styrene) and modified starch cross-linked with 0.4% adipic acid ("CERESTAR 06309 from Cerestar Benelux B.V.) (5.3 pbw in 11 pbw styrene) were stirred under nitrogen at 30° C. The cross-linked starch used had a water absorption capacity of 19 g water/g dry cross-linked starch. By heating of the mixture to 130° C. in 70 mins and maintaining this temperature for 110 mins, styrene is converted by thermal polymerisation. Subsequently, the reaction mixture is cooled to 70° C. within 40 mins. The styrene conversion is about 39%. A solution of 0.4 pbw DBP and 0.2 pbw TBPB in 6 pbw styrene was added and the mixture was homogenised at 70° C. The mixture was subsequently dispersed in 139 pbw water with 0.6 pbw HEC. The suspension was heated for 240 mins at 80° C., 60 mins at 90° C. and 120 mins at 120° C. to yield complete styrene polymerisation. The beads obtained had a water content of 8% wt and a starch content of 4.8% wt.

The beads obtained showed the same foaming behaviour as those in Example 5.

EXAMPLE 7

Styrene (75 pbw), maleic anhydride (0.5 pbw in 4 pbw styrene), and modified starch as in Example 5 (5.3 pbw in 15 pbw styrene) were mixed at 30° C. The temperature was raised to 120° C. in 60 mins and the mixture was kept at this temperature for 160 mins. Subsequently the temperature was lowered to 70° C. The styrene conversion in the pre-polymerised mass thus obtained was 32%. To the pre-polymerised mass were added 0.4 pbw DPB, 0.2 pbw TBPB and 0.04 pbw divinylbenzene in 6 pbw styrene. The mass was homogenised at 70° C. The pre-polymerised mass was suspended in 226 pbw water containing 0.9 pbw HEC. The suspension was heated for 240 mins at 80° C., for 60 mins at 90° C. and for 120 mins at 120° C. to yield complete styrene polymerisation. The beads obtained had a water content of 10% wt and a starch content of 4.8% wt.

When the beads were exposed to an air stream of 135° C., an expanded foam was obtained with a density of 80–120 g/dm$^3$.

EXAMPLE 8

Styrene (77 pbw), maleic anhydride (0.5 pbw in 3 pbw styrene), TBPB (0.025 pbw in 3 pbw styrene), and the modified starch as used in Example 5 (5.3 pbw in 11 pbw styrene) were stirred at 30° C. Polymerisation was started by increasing the temperature to 120° C. in 60 mins and keeping it at this value for 50 mins. The temperature was subsequently decreased to 70° C., while the styrene conversion in the pre-polymerised mass obtained was 28%.

A solution of lauroyl peroxide (0.66 pbw), TBPB (0.2 pbw) and divinylbenzene (0.02 pbw) in styrene (6 pbw) was added to the pre-polymerised mass and, after homogenisation, the resulting mixture was suspended in an aqueous medium consisting of 139 deionized water, 0.57 tricalciumdiphosphate and 0.1 pbw Natrosol (a cellulose derivative). The suspension was heated at 80° C. for 240 mins, at 90° C. for 60 mins and at 120° C. for 120 mins. The polystyrene beads thus obtained were separated from the suspension by filtration. The beads contained 12% wt water and 4.8% wt starch, based on amount of polystyrene.

When exposed to air of 135° C. the beads yielded a foam with a density of 80–100 g/dm$^3$.

What is claimed is:

1. Process for the preparation of polymer particles containing the polymer of a vinylarene monomer and having an average particle diameter of 0.1 to 6 mm, which process comprises:

a) mixing a polar polymer capable of absorbing at least 0.5 g of water per gram dry polar polymer, with a vinylarene monomer;

b) pre-polymerising the vinylarene monomer in the mixture thus obtained to a polymerisation degree of 15 to 50% to obtain a pre-polymerised mass;

c) suspending the pre-polymerised mass into an aqueous medium to yield suspended particles; and d) polymerising the suspended particles to complete monomer conversion.

2. Process according to claim 1, in which the polymer particles obtained are separated from the aqueous mixture and expanded to yield pre-expanded particles.

3. Process according to claim 2, in which process the pre-expanded particles are treated further to obtain foamed articles.

4. Process according to claim 1, in which the polar polymer is polyvinylpyrrolidone.

5. Process according to claim 1, in which the the polar polymer is starch or starch modified by esterificaiton or etherification.

6. Process according to claim 1, in which the amount of polar polymer ranges from 2.0 to 20% wt, based on the amount of polar polymer and vinylarene monomer.

7. Polymer particles containing a polymer of a vinylarene monomer, a polar polymer capable of absorbing at least 0.5 g of water per gram dry polar polymer, and water, which polymer particles contain from more than 3 to 40% water, based on amount of vinylarene and have an average particle diameter of 0.1 to 6 mm.

8. Polymer particles according to claim 7 which contain less than 0.5 weight % of a $C_3$–$C_6$ hydrocarbon.

9. Polymer particles according to claim 8, in which the amount of polar polymer ranges from 2.0 to 20% wt. based on the polar polymer and vinylarene.

\* \* \* \* \*